US011785429B2

(12) United States Patent
Rubin et al.

(10) Patent No.: US 11,785,429 B2
(45) Date of Patent: Oct. 10, 2023

(54) SEMANTIC CLUSTERING OF MESSAGES

(71) Applicant: Community.com, Inc., Santa Monica, CA (US)

(72) Inventors: Alec Rubin, Venice, CA (US); Skylar Kerzner, Los Angeles, CA (US); Nate Saletan, Los Angeles, CA (US); Lars Perkins, Camden, ME (US); Barry Steinglass, Bellevue, WA (US); Joshua Rosenheck, Marina Del Rey, CA (US); Tomas Koci, Venice, CA (US); Matthew Peltier, Culver City, CA (US)

(73) Assignee: Community.com, Inc., Santa Monica, CA (US)

( * ) Notice: Subject to any disclaimer, the term of this patent is extended or adjusted under 35 U.S.C. 154(b) by 0 days.

(21) Appl. No.: 17/467,135

(22) Filed: Sep. 3, 2021

(65) Prior Publication Data
US 2022/0070630 A1 Mar. 3, 2022

Related U.S. Application Data

(60) Provisional application No. 63/074,297, filed on Sep. 3, 2020.

(51) Int. Cl.
*H04W 4/14* (2009.01)
*H04W 4/06* (2009.01)
(Continued)

(52) U.S. Cl.
CPC ............ *H04W 4/14* (2013.01); *G06F 3/0482* (2013.01); *G06F 40/30* (2020.01); *G06Q 50/01* (2013.01); *H04W 4/06* (2013.01)

(58) Field of Classification Search
CPC ........... H04W 4/06; H04W 4/14; G06F 40/30; G06F 3/0482; G06Q 50/01
See application file for complete search history.

(56) References Cited

U.S. PATENT DOCUMENTS 8,532,609 B2 * 9/2013 Spector ................. G06Q 50/26
455/414.1
9,342,597 B1 * 5/2016 Tomkins ................ H04L 51/42
(Continued)

OTHER PUBLICATIONS

International Search Report and Written Opinion dated Dec. 6, 2021, for PCT/USS21/49170, Sep. 3, 2021, 13 pages.
(Continued)

*Primary Examiner* — Seth A Silverman
(74) *Attorney, Agent, or Firm* — MORRISON & FOERSTER LLP

(57) ABSTRACT

Example systems, methods, and computer-readable media are disclosed. In an example method, a first outbound text message is transmitted via a message broker of a messaging platform from a client to a plurality of recipients. In response to the first outbound message, a plurality of inbound text messages is received, via the message broker, from the plurality of recipients. A first grouping of the plurality of inbound text messages is determined, the first grouping associated with one or more recipients of the plurality of recipients. The first grouping is presented to the client. A second outbound text message is transmitted, via the message broker, from the client to the one or more recipients of the plurality of recipients. The second outbound text message is generated based on the first grouping. The message broker is in communication with a first messaging service and a second messaging service different from the first messaging service. The first outbound text message is transmitted via the first messaging service. A first inbound text message of the plurality of inbound text messages is received via the second messaging service. Each inbound text message of the plurality of inbound text message is addressed to a long-code telephone number generated by the messaging platform and uniquely associated with the client by the messaging platform.

27 Claims, 6 Drawing Sheets

(51) Int. Cl.
  *G06Q 50/00* (2012.01)
  *G06F 3/0482* (2013.01)
  *G06F 40/30* (2020.01)

(56) References Cited

U.S. PATENT DOCUMENTS

| | | | |
|---|---|---|---|
| 9,965,443 | B2 | 5/2018 | Eggink et al. |
| 10,251,115 | B2 | 4/2019 | Coglon et al. |
| 10,785,185 | B2 | 9/2020 | Vennam et al. |
| 10,990,402 | B1* | 4/2021 | Ibryam ............... G06F 12/0875 |
| 11,349,798 | B2 | 5/2022 | Peltier et al. |
| 11,444,907 | B2 | 9/2022 | Peltier et al. |
| 11,451,507 | B2 | 9/2022 | Peltier et al. |
| 11,641,333 | B2 | 5/2023 | Peltier |
| 2002/0159575 | A1 | 10/2002 | Skladman et al. |
| 2009/0006565 | A1 | 1/2009 | Hughts, Jr. et al. |
| 2010/0125491 | A1 | 5/2010 | Elliott et al. |
| 2010/0223341 | A1 | 9/2010 | Manolescu et al. |
| 2013/0086188 | A1 | 4/2013 | Mays et al. |
| 2014/0087697 | A1 | 3/2014 | Johnston et al. |
| 2014/0379814 | A1 | 12/2014 | Graff et al. |
| 2014/0379818 | A1* | 12/2014 | Cudak ................... H04L 51/216 709/206 |
| 2015/0149561 | A1 | 5/2015 | Bell et al. |
| 2015/0269697 | A1 | 9/2015 | Rivera De La Vega et al. |
| 2015/0281156 | A1 | 10/2015 | Beausoleil et al. |
| 2015/0312733 | A1 | 10/2015 | Beans et al. |
| 2015/0341300 | A1 | 11/2015 | Swain et al. |
| 2016/0344581 | A9 | 11/2016 | Karmarkar |
| 2017/0109013 | A1* | 4/2017 | Hong ...................... H04L 51/04 |
| 2017/0142036 | A1 | 5/2017 | Li et al. |
| 2017/0180298 | A1 | 6/2017 | Arbajian et al. |
| 2017/0270099 | A1 | 9/2017 | Gorny |
| 2019/0019204 | A1 | 1/2019 | Kopikare et al. |
| 2019/0028858 | A1 | 1/2019 | Johnston et al. |
| 2019/0073693 | A1 | 3/2019 | Moukaddem et al. |
| 2019/0266276 | A1 | 8/2019 | Patel et al. |
| 2019/0347668 | A1 | 11/2019 | Williams et al. |
| 2019/0364395 | A1* | 11/2019 | Trojanowski ............ G06F 40/30 |
| 2019/0386949 | A1 | 12/2019 | Vennam et al. |
| 2020/0021544 | A1 | 1/2020 | Miklos et al. |
| 2020/0133443 | A1 | 4/2020 | Lagares-greenblatt et al. |
| 2020/0145358 | A1 | 5/2020 | Yegorin et al. |
| 2020/0250625 | A1 | 8/2020 | Peltier et al. |
| 2020/0252355 | A1 | 8/2020 | Peltier et al. |
| 2020/0252361 | A1 | 8/2020 | Peltier et al. |
| 2020/0252365 | A1* | 8/2020 | Peltier ..................... H04W 4/12 |
| 2022/0294755 | A1 | 9/2022 | Peltier et al. |

OTHER PUBLICATIONS

Notice of Allowance dated May 25, 2022, for U.S. Appl. No. 16/780,890, filed Feb. 3, 2020, eight pages.
Notice of Allowance dated May 9, 2022 for U.S. Appl. No. 16/780,885, filed Feb. 3, 2020, nine pages.
European Search Report dated Feb. 10, 2022, for EP Application No. 20748971.7, eight pages.
Final Office Action dated Dec. 29, 2021, for U.S. Appl. No. 16/780,890, filed Feb. 3, 2020, twelve pages.
Notice of Allowance dated Jan. 14, 2022, for U.S. Appl. No. 16/780,893, filed Feb. 3, 2020, eight pages.
Final Office Action dated Apr. 30, 2021, for U.S. Appl. No. 16/780,893, filed Feb. 3, 2020, 30 pages.
Final Office Action dated Oct. 28, 2021, for U.S. Appl. No. 16/780,885, filed Feb. 3, 2020, 20 pages.
Final Office Action dated Sep. 15, 2021, for U.S. Appl. No. 16/780,878, filed Feb. 3, 2020, 17 pages.
International Preliminary Report dated Aug. 12, 2021, for PCT/US2020/016454, filed Feb. 3, 2020, seven pages.
International Search Report and Written Opinion dated May 7, 2020, for PCT/US2020/016454, 7 pages.
Non-Finai Office Action dated Dec. 8, 2020, for U.S. Appl. No. 16/780,878, filed Feb. 3, 2020, 14 pages.
Non-Final Office Action dated Mar. 30, 2021, for U.S. Appl. No. 16/780,885, filed Feb. 3, 2020, 31 pages.
Non-Final Office Action dated May 25, 2021, for U.S. Appl. No. 16/780,893, filed Feb. 3, 2020, 17 pages.
Non-Final Office Action dated Oct. 2, 2020, for U.S. Appl. No. 16/780,893, filed Feb. 3, 2020, 27 pages.
Notice of Allowance dated Sep. 13, 2021, for U.S. Appl. No. 16/780,893, filed Feb. 3, 2020, eight pages.
European Office Action dated Oct. 17, 2022, for EP Application No. 20748971.7, nine pages.
Notice of Allowance dated Dec. 27, 2022, for U.S. Appl. No. 17/588,116, filed Jan. 28, 2022, nine pages.
International Preliminary Report on Patentability and Written Opinion dated Mar. 16, 2023, for PCT/US2021/04S170, filed Sep. 3, 2021, seven pages.
Notice of Allowance (Corrected) dated Jan. 11, 2023, for U.S. Appl. No. 17/588,116, filed Jan. 28, 2022, five pages.

* cited by examiner

SEMANTIC CLUSTERING OF MESSAGES

CROSS REFERENCE TO RELATED APPLICATION

This application claims the benefit of U.S. Provisional Application No. 63/074,297 filed on Sep. 3, 2020, which is incorporated herein by reference in its entirety.

TECHNICAL FIELD

The subject matter described herein relates to an electronic messaging platform, and more particularly to a system and method for semantic clustering of response messages in a messaging platform for exchanging messages between a client (such as an influencer, celebrity, company or the like) and users (such as fans of the client).

BACKGROUND

Electronic messaging exists in many different forms, and typically occurs over a wireless communication channel between computing devices, which are often mobile computing devices such as smart phones, laptop computers, or tablet computers. Electronic messages can take the form of text, graphics (such as an image, video, or other graphics such as an "emoji.") There are many different electronic messaging protocols, such as Short Messaging Service (SMS), which is often limited only to short text messages, and Multimedia Messages (MMS), which can contain digital images, videos, audio content, and ideograms such as emojis, GIFs, or the like. etc.

There also exists various application platforms for exchanging electronic messages. Most commonly, electronic messages are sent and received over a wireless cellular network based on a user's long-code phone number, i.e. in the U.S., the three-digit area code plus seven-digit mobile phone number that is assigned to a user by a carrier that controls the wireless or cellular network and manages any traffic on such network.

While most messaging is performed peer-to-peer (P2P) or even in small groups, one-to-many communication of messaging at a massive scale, i.e. a "social media" type application having more than just a handful of message recipients, is technically difficult and challenging. Other than social media applications and platforms such as Facebook®, Twitter®, Instagram®, and others, large-scale communication of messages between clients (also referred to herein as "influencers," "celebrities,", "leaders" or the like) and associated users (also referred to herein as "fans," "audience," "followers,", "members" or the like) is limited by the wireless networks and the carriers that manage them, and by the technologies themselves.

However, engagement rates, which define how a user might be interacting with, following, or communicating with a client, over text messaging far surpass the engagement rates on social media platforms mentioned above. Yet still, at large scale, clients have a difficult time managing and keeping up with the large numbers of messages, both transmitted and received. Audience platforms and audience targeting exist, but have not been done for text messaging platforms because one-to-many communication has previously not been possible at large scale. In addition, it is very difficult to organize, understand and respond to a large number of messages.

SUMMARY

This document describes a messaging platform, system and method for semantic clustering of messages sent from many users to one leader, potentially in response to an outgoing message sent by the leader. Clustering of messages allows for identifying a semantic or logical meaning behind each cluster of messages, to be able to review the responses or generate a suitable reply message by the leader.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and describe example implementations.

DETAILED DESCRIPTION

Figure 1:
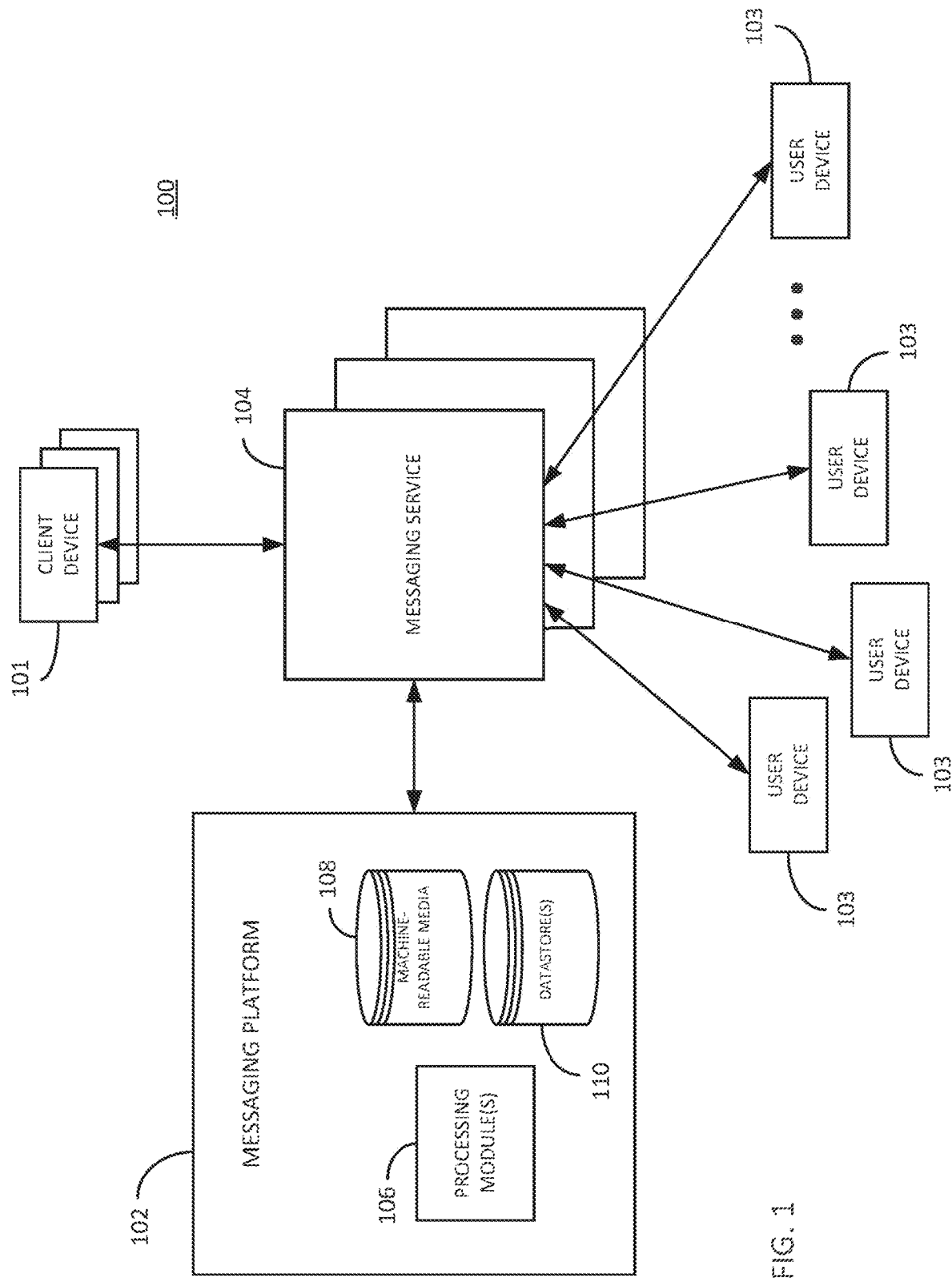
FIG. 1 illustrates an example one-to-many messaging platform.

In accordance with some implementations of the subject matter described herein, a Software-as-a-Service (SaaS) platform is provided which facilitates one-to-many communication over text messaging at massive scale. FIG. 1 illustrates an example system 100 for managing inbound and outbound messages at large to massive scale, from individual ones of clients to several and up to many millions of users. The system 100 includes a messaging platform 102 for processing, storing and executing various automated functions on messages exchanged between a client device 101, such as mobile phone, tablet computer, laptop computer, desktop computer, or the like, and a number of user devices 103, also such as mobile phone, tablet computer, laptop computer, desktop computer, or the like. Each of the client device 101 and user devices 103 include communication modules such as a transceiver or radio for communicating messages wirelessly over one or more messaging services 104, such as is provided by a wireless carrier, an application provider, or other service provider. In examples, each client device 101 and each user device 103 communicates messages over a different messaging service. For example, a client device 101 may communicate messages via a first messaging service, a first user device 103 may communicate messages via a second messaging service, and a second user device 103 may communicate messages via a third messaging service, where the first, second, and third messaging services are different messaging services.

The messaging platform 102 of the system 100 includes one or more processing modules 106 that execute instructions from non-transitory machine-readable media 106, or which include a hard-wired processor such as an application-specific integrated circuit (ASIC), a reprogrammable or reconfigurable processor such as a field-programmable gate array (FPGA), or other computer processor. The one or more processing modules 106 process user and client data, as well as inbound and outbound messages (in both directions), for aspects such as sentiment, content, semantics, mood, receptiveness, or the like, and which are further described below. The messaging platform 102 further includes one or more datastores 110, which can include one or more of a relational database, a non-relational database, a database cluster of distributed database nodes, and/or cloud storage. Each datastore 110 includes both hardware and software to execute data storage, organization, and retrieval functions.

As in one example, a large number of users can text their favorite clients just as easily as they would text a friend or family member. Clients of the platform can capture, segment, and reach millions of users using a communication channel that provides unparalleled engagement rates. Clients can send videos, images, text and/or emojis directly with each individual user of their audience in one-to-one direct messages, or send broadcasts of messages to their entire audience at thousands of messages per second, without being filtered or otherwise limited by SMS carriers. Clients can reach their users directly and build audience identity and targeting data directly, without depending on social media platforms who hoard this information from the client. Clients can do this using an actual, durable long-code phone number so that users can store the client in their address book or contact list in their user device 103.

Accordingly, each user can use the system as if they have a direct connection to a client. In some implementations, the system employs intelligence in the form of machine learning or artificial intelligence to help clients and their users determine who to engage with, and when. The system provides scalability, so that each client can understand and interact personally with millions of users, as augmented by the system to assist the client in generating realistic messages that are contextually-relevant and even user-specific.

In some implementations, the system generates a unique long-code telephone number for each client. The system collects data from each user who sends a message to the client according to the assigned unique long-code telephone number and via any of a number of communication channels or messaging services thereon. The system monitors activity, location, and purchases by users to provide clients with intelligent suggestions on who to message. These targeted messages can be contextually-aware and relevant to the messaging content, as well as to user preferences and engagement levels.

In some implementations, the system includes a client dashboard. The dashboard can be formatted for a desktop or laptop computer graphical user interface (GUI), or for a user interface (UI) of a mobile device such as a mobile smart phone or tablet computer. The dashboard can be generated by a computer program or application, and can be integrated or connected with an analytics engine and/or performance and monitoring engine.

The system can include one or more application programming interfaces (APIs) for interfacing with, without limitation, a cloud communication platform such as Twilio®, and a computing resource manager such as Apache Mesos®. The system can include a data management platform (DMP) that stores information about the audience of each client. The DMP can be a multi-tenant database to segregate the data based on client, and can protect the data by any number of data protection measures. For instance, user data can be secured so as to not be shared or accessed by third party data processing systems, which is a major flaw of conventional social networking platforms.

The system can be configured to perform grouping and aggregating. For example, message from users can be grouped and/or aggregated by area code, city, age, state, sex, etc. In some implementations, messages can be grouped by content aware grouping, using AI, Natural Language Processing, etc. for creating topics and/or conversations. In this manner, if a conversation is defined for a group of messages, the messages can be aggregated by conversation to involve some or all users associated with a client.

The dashboard provides message sorting of inbound messages based on one or more variables or settings, such as keywords, contextual analysis, user demographics, or the like. The dashboard also allows clients to manage their messaging activity with their users by aggregating, segregating, filtering, testing, or processing messages according to one or more variables, such as user demographics, number of messages, local time zones, message content, or the like.

When sending a message to a large audience and getting large numbers of replies, an example system prioritizes and groups the replies so that the sender can focus on the ones that are most significant, and can send additional broadcast messages to responders (users) grouped by similar replies or other common characteristics. An example system can further automatically generate groupings based on analysis of reply content; automatically generate suggested replies to those groups; and automatically prioritize these conversations for the sender. In a one-to-many communication system, the large numbers of replies can be difficult to manage on a one-to-one basis; this concern can be alleviated by grouping messages and permitting batch replies to messages (e.g., on a per-group basis). Software-assisted grouping, along with the other features listed above, enable senders to effectively maintain two-way communication with large numbers of recipients.

Figure 2:
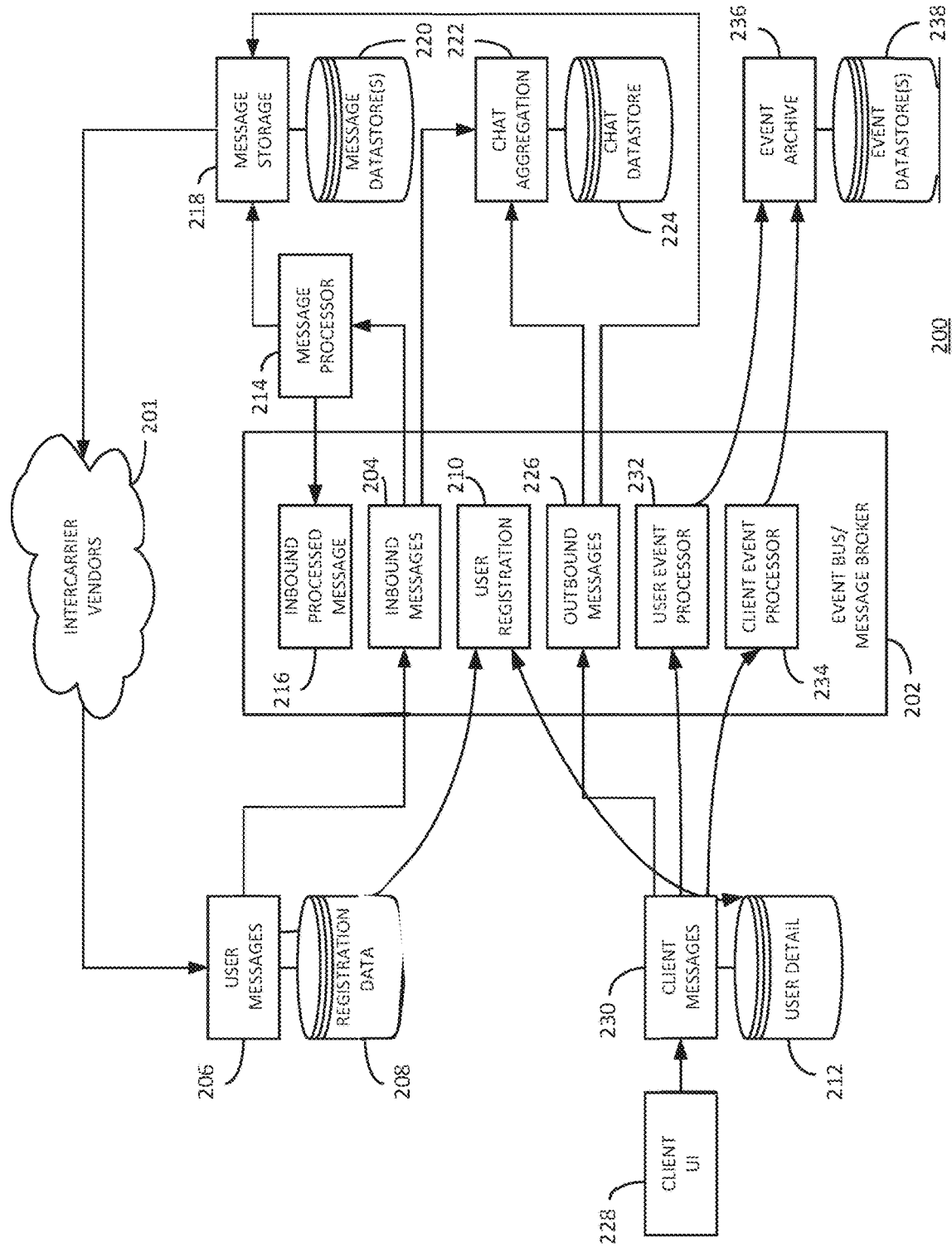
FIG. 2 illustrates an example messaging architecture for a one-to-many messaging platform.

The system can include one or more processing modules for executing various functions. FIG. 2 illustrates an example messaging platform 200 that provides an event bus and message broker 202. The event bus and message broker 202 processes, queues and manages inbound and outbound messages that are transmitted via one or more messaging services provided by intercarrier vendors. In some implementations, the event bus and message broker can use advanced message queuing protocol (AMQP) or the like. The event bus and message broker 202 includes an inbound messages module 204 for managing messages received from one or more of the intercarrier vendors 201 via a user messages processor module 206, which can include a message service handler (MSH) or message gateway, such as Hermes® or the like.

User messages inbound from the intercarrier vendors 201 are checked against user registration data in a user registration datastore 208 for existing, registered users, and then queued for being processed by the inbound messages module 204 of the event bus and message broker 202. Any messages received from a non-registered user are queued in a user registration module 210 for onboarding the user, where user information such as demographic data, phone number, behavioral information, or the like, is stored in a user detail datastore 212. At least some of the inbound messages received by the inbound messages module 204 are sent to message processor, which processes the messages with one or more artificial intelligence algorithms or machine learning for executing functions such as, without limitation, determining semantics, sentiments and or mood, user engagement, or the like. Processed messages are sent to an inbound processed message module 216 for functions such as filtering, grouping (both by user, such as age, gender, city, or the like, and by message, such as message content, semantics or sentiment), and other functions. Processed inbound messages are also sent by the message processor 214 to a message storage module 218 for storage in a message datastore 220, which stores a permanent message record, which messages.

Inbound messages that are not processed by the message processor 214 can be sent to a chat aggregator 222 for aggregation, recordation and persistence in a chat datastore 224. These inbound messages can be combined with outbound messages based on their being part of an ongoing "chat" or dialog of related messages or messaging threads.

The event bus and message broker 202 further includes an outbound messages module 226 that receives client messages from a client user interface (UI), such as is provided by a messaging application on the client device, or from a dashboard provided by the messaging platform, and via client messages processor 230. The client messages processor 230 checks outbound messages from the client to the users against the user detail datastore 212 to ensure each targeted user is registered and/or active with the system 200, or to assist in modifying, curating, filtering or other processing of outbound messages, such as adding text to the message, modifying or augmenting a message based on user behavior or demographics, or the like. As with the inbound messages module 204, the outbound messages module 226 can send some or all of the outbound messages to the chat aggregator 222 for aggregation, recordation and persistence in the chat datastore 224. The outbound messages module 226 also sends outbound messages to the message storage module 218 for storage in the message datastore 220, and for dispatch to the intercarrier vendors 201.

Outbound messages from a client define an event, which can be further processed by user event processor 232 if related to one or more users, or client event processor 234 if related to the client. Events are sent to an event archive for storage in an event datastore 238.

In some implementations, the system 200 is configured with a module for predicting various useful metrics or policies around user behavior, including predicting churn, i.e. a modeling system for predicting churn or a propensity of a user to drop out of the messaging platform. The goal of the modeling system can be to optimize engagement or other actions by users. In some cases, the system can employ natural language processing to ascertain a mood or engagement of a user, or other information about the user, including predicting their future actions or modeling what inputs would impact their future actions. In other cases, the system can automatically generate a "suggestion card" soliciting an action from a client based on ascertained information regarding the behaviors or states (moods, thoughts, actions, circumstances) of that client's users or another client's users.

Semantic Clustering of Messages

Figure 3:
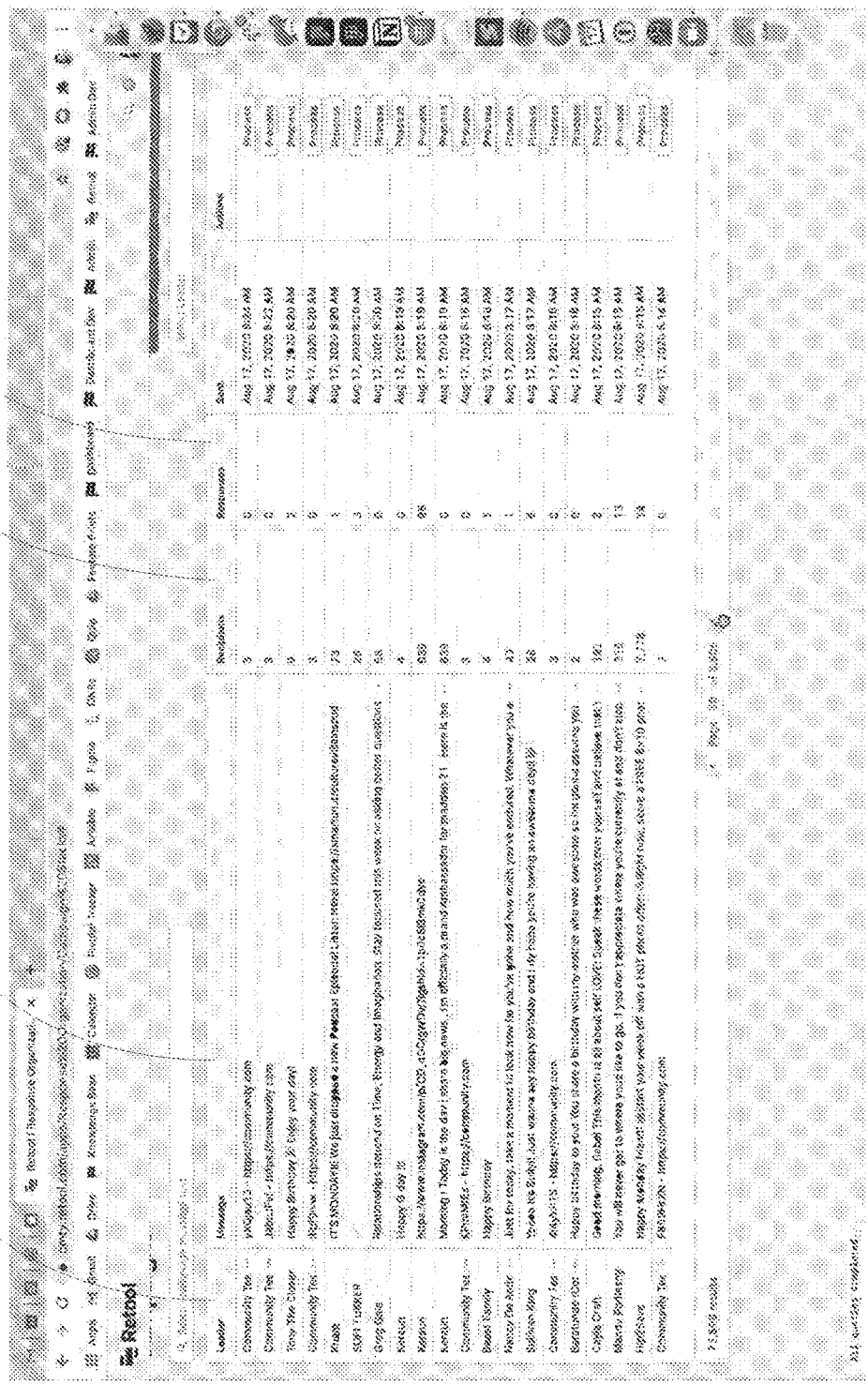
FIG. 3 illustrates an example tool and user interface for displaying semantic clustering of response messages to a message related to a campaign by a leader.

FIG. 3 illustrates an example tool and user interface 300 to display clustering data, based on outbound campaigns by leaders 302 using a one-to-many message 304, and responses 308 from users/followers ("recipients" 306) of the message related to each outbound campaign. The responses 308 from users are then grouped together in what are called "clusters," which enables the system to demonstrate how response messages are clustered. In some implementations, a response is any message received by a leader within a predetermined timeframe (i.e. 6 hours) from when the outbound campaign message was sent. The predetermined timeframe—or other criteria for classifying inbound messages as a response to be clustered—can be adjusted dynamically by the leader 302, based on the content of the message 304 or focus of the campaign, based on the recipients 306, based on a time the outbound message was sent, or any other parameter or combination thereof. In other implementations, clustering of responses can occur based on responses that include similar text of, or which reference text in, the outbound messages, or are semantically related to other user messages.

In some examples, each message can be tailored for a specific audience of recipients. For instance, a particular leader may have hundreds of thousands of unique followers in their "community" but, using the messaging platform described herein, may choose to send each particular message to a targeted group of recipients i.e., a "subcommunity", based on criteria, attributes or demographics such as, without limitation, gender, age, geographic location, time of day, education level, political and/or religious and/or cultural affiliation, interests, historical responses, and/or the like. Further, each of the users/followers can designate themselves to one or more subcommunities specified by the leader. These groups might also be created via Natural Language Processing including semantic or sentiment analysis of user messages, as well as other user actions including but not limited to link clicks, purchases, or other engagement.

Figure 4C:
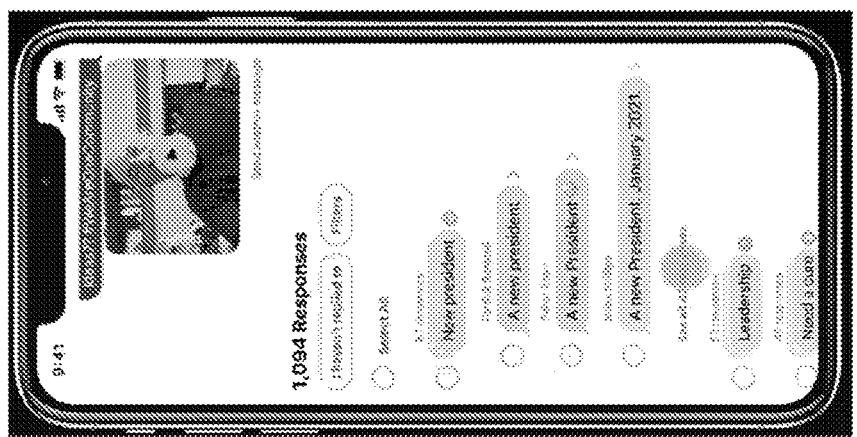
FIGS. 4A-4E illustrate various example user interfaces of a tool for displaying semantic clustering of messages, and for enabling selection of individual clusters for generating a reply based on a semantic meaning of an individual cluster.
Figure 4B:
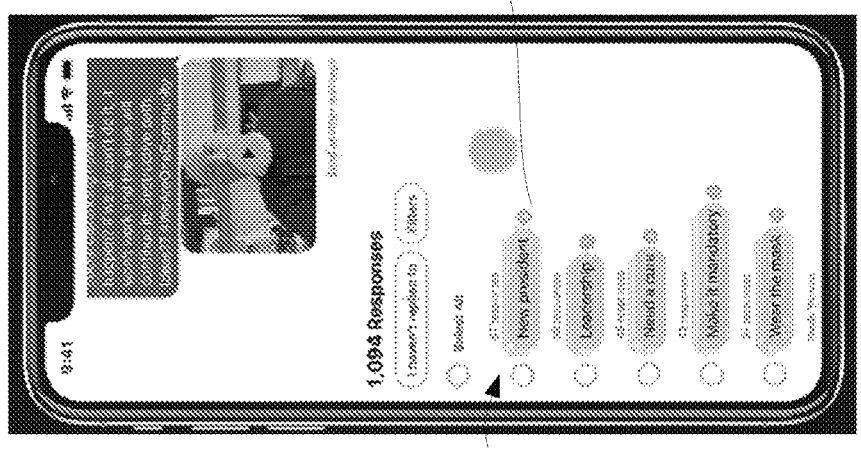
Figure 4A:
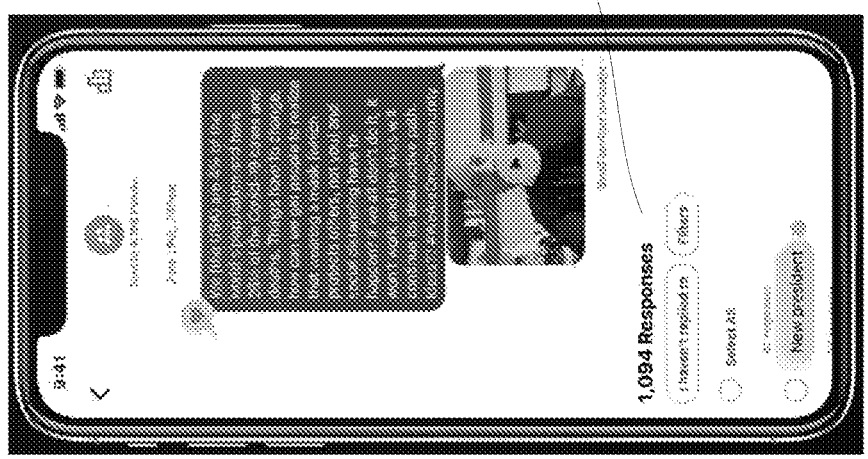
Figures 4D, 4E:
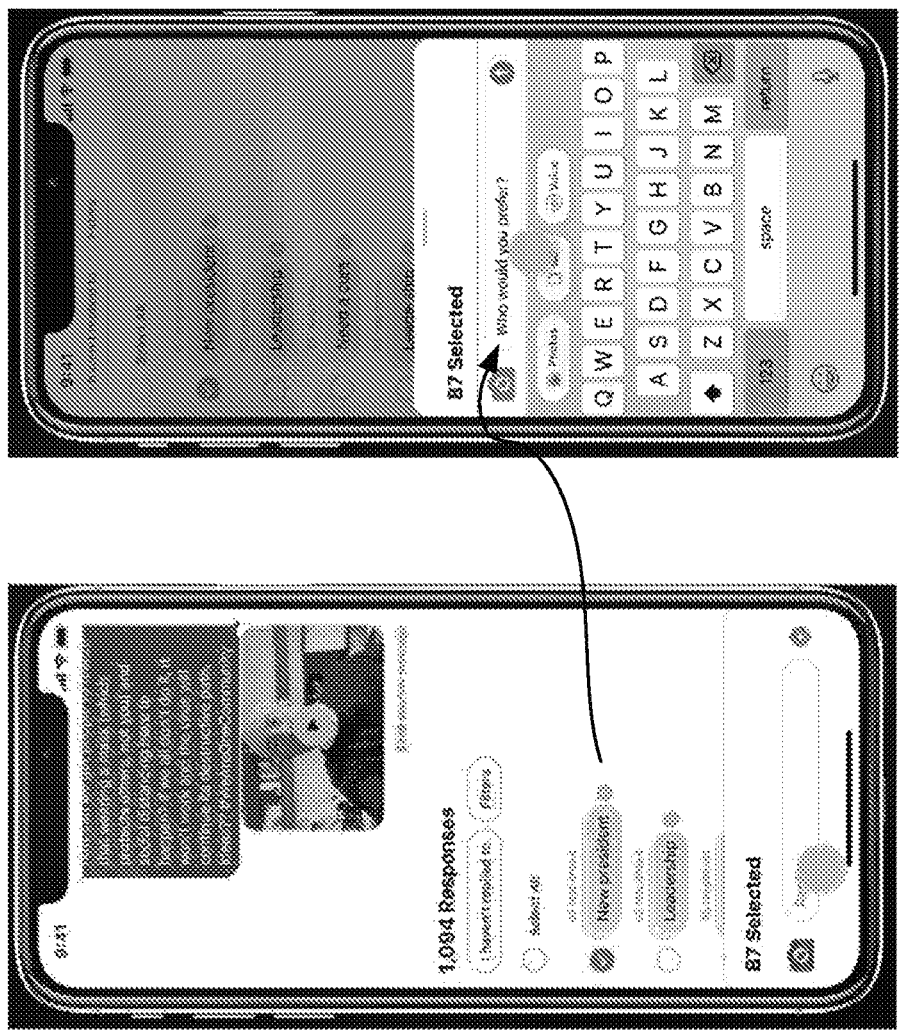

FIGS. 4A through 4E illustrate an example user interface of a tool for clustering, selecting, and generating a reply to user-sent messages that are a response to a message from a leader. As an example, as shown in FIG. 4A, a leader with 4388 followers sends a message to the followers, and receives 1094 responses, which are pre-processed and clustered according to the algorithms described herein. As shown in FIG. 4B, the clustering can be ordered by number of related messages, by semantic meaning or topic, or other order. In the user interface, each cluster can be represented by a graphical bubble that contains one or more words representative of the cluster, or of the semantics that define the cluster. As shown in FIG. 4C, each cluster can be individually selected for a leader to drill down further on one or more subgroups of the cluster, each defined by specific, different words used by the followers in their responses. The leader can select any of these clusters or subgroups, as shown in FIG. 4D, and the system can provide a reply interface for sending a suitable reply to the cluster or subgroup, as shown in FIG. 4E. The reply interface can generate an automatic or pre-programmed reply using artificial intelligence, or be based at least in part on the words or semantic meaning or sentiment associated with the cluster or subgroup, or can be dynamically generated by the leader themselves, or a combination thereof.

Contexts for Clustering

As described above, and in accordance with some implementations, a system and method is configured to group incoming messages from users/followers (or, members) to leaders. For each set of incoming messages with a shared context those messages are grouped, and presented to a leader of those users.

That shared context could be all responses to a single campaign sent by the leader, or alternatively, all user-sent messages sent within a certain timeframe (e.g., within a threshold time of a time when an outbound message was sent by the leader), or alternatively, determined by the content of the messages. In some implementations, a system and method can be configured to identify which messages are campaign responses. In some specific implementations, the system and method apply clustering to the first responses, and then if later responses correspond, semantically, logically or using another analytical, to one of these clusters, it can be designated as a campaign responses, and otherwise it is not so designated.

Data-Driven Clustering

A common theme of each group can be a shared semantic meaning or other relationship, in such a way that the leader is able to respond to every member in the group with a single response, where that response is a sensible response to the semantic meaning of all messages within the group. The groups created in a single message context (all member responses to a single campaign) are based on the distribution of semantic content across those member responses.

In accordance with preferred implementations, each incoming message (i.e. words generated from 140 characters in the case of an SMS message) is divided up into the component words and/or icons (i.e. tokens) that comprise that message, which are then further analyzed to determine any relevant combinations of words and/or icons, including adjacent sets of tokens (i.e. n-grams). That determination is then statistically compared with the entire corpus of response messages being analyzed, to determine which of those n-grams occur most frequently. For instance, a true word sequence that is common between the messages is isolated, and the other words (i.e. "noise") contained in the message are scored as less significant because they may not be a statistical anomaly within the corpus that is being analyzed. Other patterns of words can be treated similarly.

Sets of n-Grams

In particular, sets of n-grams, individually called "x-grams," that are common to a multitude of messages within a single context are used to define the semantically meaningful groups. X-grams also allow better focusing on which of the responses, or groups of responses, to reply to, or how to reply in a contextually-related or relevant manner or tone. Those sets of n-grams may be sensitive to the order in which the n-grams appear in the member messages. They also take into consideration when certain words are effectively negated in its message (e.g. In "not a very hard class", the word "hard" is negated, so that the opposite meaning is intended). In some examples sets of n-grams that are not common within the messages are not used to define a group.

Figure 5:
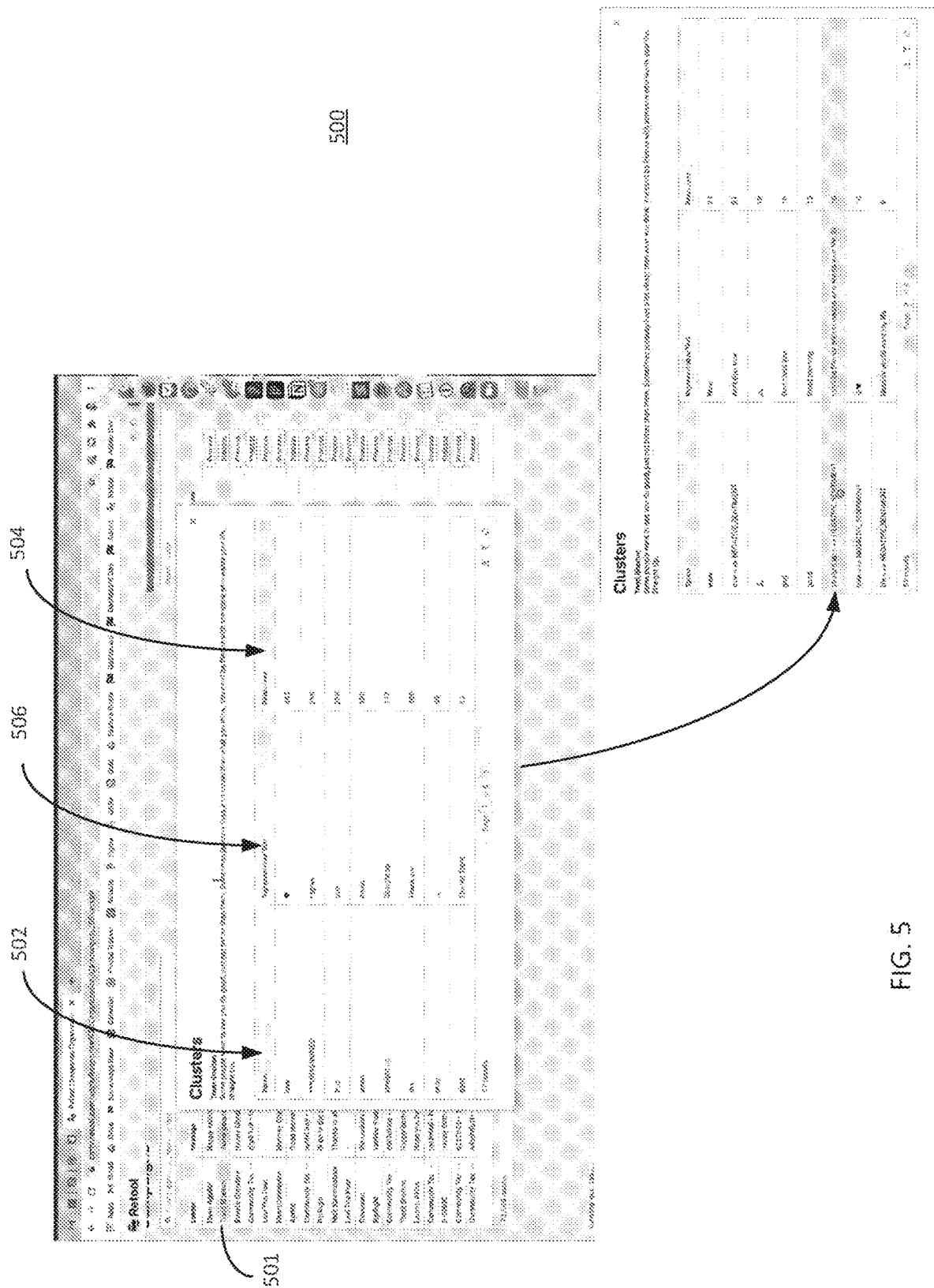
FIG. 5 illustrates an example clustering by x-grams according to lexicographic and/or iconographic analysis, including sentiment analysis.

FIG. 5 illustrates an example tool and user interface 500 for displaying x-grams 502 related to responses to a message from a leader 501. Incoming messages are mapped onto their constituent x-grams, and then the frequency at which those x-grams occur across the corpus (entire or subset) of incoming response messages is utilized to organize the messages.

In some examples, an entire corpus of responses 504 is received and parsed for textual or contextual meaning by a rules engine, which can detect representative text 506 or graphics such as icons, emojis, etc. Each x-gram can be a set of any number of n-grams, where each n-gram can have any number of tokens. Additionally, sentiment (negative or positive), or whether the response includes a question, can be applied by the semantic parsing algorithm to tag the x-grams with additional qualifiers that are valuable for clustering.

Cluster Significance Scoring

Messages are assigned to the most significant cluster that they match to, so that they are grouped or assigned the most complex and meaningful group possible. The significance of a set is determined by a method that utilizes the x-grams and additional mappings undergone by the tokens and phrases that were mapped to the x-grams. In some implementations, a simple heuristic can be used, but more advanced algorithms can be employed, for example, which use interdependence with the variants as described below.

Question Tagging

Variants of the groups based on x-grams ("sets of n-grams") are created in order to semantically partition distinct kinds of messages that have the same sets of n-grams but different semantic or sentiment meaning, and therefore call for a different reply. One of those variants is when the messages are interrogative messages (i.e. questions). In some implementations, a set of analytical rules are employed to identify questions in SMS, which are often missing punctuation and do not always follow standard grammatical rules, but which can be ascertained by an algorithm.

Sentiment Analysis and Application to Clustering

Another variant of the ordered sets of n-grams includes information on the sentiment of a message, as determined by sentiment analysis. The sentiment analysis model can utilize lexicons of predetermined sentiment polarity values for a large number of n-grams, trained on data from SMS, Twitter or other corpora, and including different values depending on whether each token is negated (and specifically whether it is directly negated or more indirectly negated).

In some implementations, a method of scoring a message's sentiment is performed by looking up a message's words (tokens) in the various lexicons in a way that best represents the meaning of the message, and accounts for the considerations of a message domain (SMS), and the domains in which the lexicons were generated. In particular, a sequence of tokens can be used in the message along with multiple sentiment lexicons of n-grams, with n of various values, and some containing negation context. The lexicons are mapped on to the sequence of tokens in a message in various ways, including using the entries in multiple lexicons containing the same tokens, and utilizing sequences of tokens that are not necessarily adjacent inside the message and inside the lexicon.

In some implementations, lexicons can be generated from internal datasets or publicly available external datasets. In addition, sentiment analysis can be expanded to methods that require more online computation, such as utilizing multidimensional representations of n-grams and messages, as well as models that involve a high number of computations per message, potentially involving neural architectures. A part of speech tagging and dependency parsing can also be used to identify key relationships in messages and utilize them in creating useful sentiment lexicons and scoring messages for sentiment (or other values or classifications).

Emojis, or graphical icons to represent a sentiment, are another form of communicating sentiment, and tend to be standard across all platforms. Mappings can be performed in preprocessing to normalize similar emoji types to be either the same emoji or a word definition, to generate their own n-grams or x-grams, where they are no different than any other word and have their own meanings. In some implementations, the sentiment of each emoji is predefined or predetermined, using an algorithm that utilizes corpora of data (SMS, Twitter or other) as well as lexicons of tokens and other scoring algorithms. The resulting polarity (positivity/negativity) score, similar to the n-gram lexicons, can be used toward scoring messages that contain emojis.

Combinations of Tags

Combinations of multiple variants (Question, Sentiment, and token-level negation) can be used to create a large number of potential clusters for a single set of n-grams. The goal is to separate messages that require different responses from the leader, and to make a large number of messages comprehensible by dividing them into the most meaningful groups. The leader can also use these combinations of variants as filters for isolating messages or groups of messages that suit their needs.

Cluster Consolidation

Groups of messages can be consolidated or dissolved—and messages can be moved between groups—depending on additional metrics, and according to client input.

Streaming

The user experience and the back end implementation can allow for additional messages to stream in and be assigned to the clusters after they are created, whereby the leader can handle responding to them appropriately, possibly automatically. For example, in some implementations of a system, a leader can set a response to a group of messages, and then additional future messages that are assigned to that group in the future will automatically receive the appropriate response set by the leader.

Data-Independent Message Clusters

In some implementations of a system, messages can be grouped into a series of predefined clusters that supersede data-driven clusters. That is to say, messages only undergo data-driven clustering if they are not assigned to one of these groups. Messages assigned to these groups may have a significant impact on the member's user experience, including being removed as a member, having messages ignored, or receiving additional messages. These clusters will also constitute a user experience for the leader that is distinct from the data-driven clusters. Examples of these data-independent clusters are profanity, skepticism, stop-intent, purchase-related behavior, as well as messages that request a specific reply. These "static groups" exist in every campaign. Instead of using the distribution of content across user messages to create the groups, these groups are present regardless of the other user messages, and a message is assigned to these groups based on static criteria.

In particular, messages are assigned to these clusters when they match with static sets of n-grams, which may or may not be sensitive to the order of the n-grams in the member's message. Those static sets were manually created to identify SMS messages that call for these special treatments, and those rules are potentially specific to this particular context of message responses to a Leader's campaign.

Preprocessing

A system includes a pipeline of text preprocessing before the messages undergo data-driven clustering. These steps are dependent on changes made in previous steps to create the desired final product.

In particular, lists of SMS-slang replacements and stopwords are generated manually to address the domain of SMS data, potentially specific to this particular context of campaign responses. Some of the replacements are also designed to work in concert with elements of the clustering algorithm, like choosing a replacement based on its complexity, which is a key heuristic for assigning messages to groups in the clustering algorithm.

Digits and emojis can also be mapped, as discussed above, using existing tools and lexicographic analysis. The algorithm utilizes rules around repeating characters as well, which may differ between n-gram generation and sentiment scoring, or other aspects of the system. The system also deals with whitespace, capitalization, and punctuation in a way that optimizes the final outcome. The order and the method of mapping digits, emojis, and SMS-slang into common English replacements as well as removing a list of semantically meaningless words (stopwords) can be beneficial to improve the speed and effectiveness of the data-driven clustering algorithm.

Automated Mapping of Slang Tokens

Automating the creation of maps from SMS-slang to the best English replacement for the purposes of the clustering algorithm can be automated, in accordance with implementations described herein.

Display of Message Group/Stacks

Optimizing Ordering of Messages for Visual Display

In accordance with some implementations of a system, the ordering in which a group of messages is displayed to the leader can be optimized. The goals of such optimization are to increase the speed at which a leader can read the messages in a group and understand their semantic and stylistic content, as well as to create an aesthetically pleasing experience for the leader.

In particular, messages within a group are themselves placed into a hierarchy of subgroups based on the first few words in each message. The goal of this hierarchy is to ensure that messages are placed next to other messages that begin with the same words, and to order the subgroups of messages from those with shorter messages to those with longer messages. At the end of the hierarchy, which may be any number of tiers (typically 2-3, one for each of the first 2-3 word indexes), the messages in each of the smallest subgroups are ordered alphabetically.

The implementation of this sorting algorithm is also significant, as it is undesirable to load an entire group of messages into memory in order to determine which ones to display first. Therefore the data model in the database is designed so that this sorting algorithm can be done in the database. It also must be efficient in the addition of new messages, which can break the ordering of various levels of the hierarchy. Accordingly, data storage is economized and made more efficient.

Representative Message of a Data Driven Cluster of Messages

In some implementations, when the leader sees a group of messages in the user interface, they will by default see only a representative message, unless they choose to expand the group in the UI and see all the messages inside (employing the visual display ordering algorithm). Accordingly, the system identifies the message in each data-driven cluster that serves as the representation of the cluster's semantic content.

In particular, the frequency of all words within a group of messages is viewed, and the degree to which a message contains words that are uncommon to the cluster is evaluated, with an emphasis on more meaningful words. The representative message is chosen based on which message contains words with the greatest frequency in the group of messages, as well as potentially accounting for other aspects like message length. Additionally, this analysis does not utilize the same preprocessing as the clustering system, as the raw message aesthetic must be considered in determining which message is the best visual representation of the cluster. Word frequencies are therefore case-sensitive, and without replacements for SMS-slang, digit and emojis, in order to identify the message whose raw form is most like the raw form of other messages in the group, for the sake of visually displaying a raw message that truly represents the raw messages in the group.

Utilizing Conversation History and Context

In some examples, historical messages can be analyzed in order to learn more about followers and leaders, and their communication, to facilitate new features. The set of all historical messages between a given follower and a leader can provide a semantic context that informs analytics on all messages, which will achieve greater insight than using a single, situational context (e.g. the context of message responses to a single leader campaign).

In addition to a history of message texts, the full context can include a timing of messages, and external factors impacting messages such as current events, as well as links and rich media in messages such as images, video, and/or audio. For instance, links in a message can be analyzed for their own content and context, which can be associated with the message for proper association with a cluster. Analytics that utilize the conversation history and context can be used to group messages, learn about followers and leaders, and create better strategies to facilitate communication over the platform.

Promotion Detection and Recommendation

In some implementations, a system is configured to detect an increased velocity of new memberships for a single leader, which is known as "a promotion." These are typically instances where a leader externally promotes themselves, e.g. in a live event, on some form of media, or on another platform. This system can be used to learn the dynamics of promotions, which can be further used to optimize the leaders' new membership velocities. Recommendations can be generated by the system and sent to leaders on the details of promotions that they should run.

Message Recommendation

In some implementations, a system can recommend what messages a leader should send. For instance, the system can recommend content for a leader to send to its followers, as well as which subsets of followers to send messages to, and the timing of the messages. It can utilize various inputs from the leader to work toward the best recommendation, of an outgoing message or any reply messages after responses are received.

This system can be built on a multitude of information sources, including external data, and the contexts and histories of messages. This system can utilize and optimize for various metrics, including metrics around member responses, member engagement with links or rich media and associated outcomes, as well as new memberships, both for the leader in question and for other leaders.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In example methods, a first outbound text message is transmitted via a message broker of a messaging platform from a client to a plurality of recipients. In response to the first outbound message, a plurality of inbound text messages is received, via the message broker, from the plurality of recipients. A first grouping of the plurality of inbound text messages is determined, the first grouping associated with one or more recipients of the plurality of recipients. The first grouping is presented to the client. A second outbound text message is transmitted, via the message broker, from the client to the one or more recipients of the plurality of recipients. The second outbound text message is generated based on the first grouping. The message broker is in communication with a first messaging service and a second messaging service different from the first messaging service. The first outbound text message is transmitted via the first messaging service. A first inbound text message of the plurality of inbound text messages is received via the second messaging service. Each inbound text message of the plurality of inbound text message is addressed to a long-code telephone number generated by the messaging platform and uniquely associated with the client by the messaging platform. In some examples, the first outbound text message is associated with a first time; and determining the first grouping of the plurality of inbound text messages comprises determining that each inbound text message of the first grouping was sent within a threshold time of the first time. In some examples, determining the first grouping of the plurality of inbound text messages comprises determining that each inbound text message of the first grouping is associated with a first semantic meaning; and generating the second outbound text message based on the first grouping comprises generating the second outbound text message according to the first semantic meaning. In some examples, the method further comprises determining a first n-gram; and determining the first grouping of the plurality of inbound text messages comprises determining that each inbound text message of the first grouping comprises the first n-gram. In some examples, determining the first n-gram comprises determining, based on an occurrence frequency of the first-n-gram within a corpus of response messages, that the first n-gram is statistically significant. In some examples, the first n-gram comprises a graphic. In some examples, the method further comprises associating the first-n-gram with a first semantic meaning; determining the first grouping of the plurality of inbound text messages further comprises determining that each inbound text message of the first grouping is associated with the first semantic meaning, and generating the second outbound text message based on the first grouping comprises generating the second outbound text message according to the first semantic meaning. In some examples, the method further comprises associating the first n-gram with a second semantic meaning different from the first semantic meaning; and determining the first grouping of the plurality of inbound text messages further comprises determining that each inbound text message of the first grouping is not associated with the second semantic meaning. In some examples, presenting the first grouping to the client comprises presenting to the client, via a graphical user interface, a plurality of groupings including the first grouping; and the method further comprises receiving, from the client via the graphical user interface, a selection of the first grouping.

In example systems, a system comprises a messaging platform comprising a network interface and further comprising a message broker, the messaging platform in communication via the network interface with a message broker, the message broker further in communication via the network interface with a first messaging service and a second messaging service different from the first messaging service; and one or more processors configured to perform a method comprising transmitting a first outbound text message via the message broker from a client to a plurality of recipients. In response to the first outbound message, a plurality of inbound text messages is received, via the message broker, from the plurality of recipients. A first grouping of the plurality of inbound text messages is determined, the first grouping associated with one or more recipients of the plurality of recipients. The first grouping is presented to the client. A second outbound text message is transmitted, via the message broker, from the client to the one or more recipients of the plurality of recipients. The second outbound text message is generated based on the first grouping. The message broker is in communication with a messaging platform. The messaging platform is in communication with a first messaging service and a second messaging service different from the first messaging service. The first outbound text message is transmitted via the first messaging service. A first inbound text message of the plurality of inbound text messages is received via the second messaging service. Each inbound text message of the plurality of inbound text message is addressed to a long-code telephone number generated by the messaging platform and uniquely associated with the client by the messaging platform. In some examples, the first outbound text message is associated with a first time; and determining the first grouping of the plurality of inbound text messages comprises determining that each inbound text message of the first grouping was sent within a threshold time of the first time. In some examples, determining the first grouping of the plurality of inbound text messages comprises determining that each inbound text message of the first grouping is associated with a first semantic meaning; and generating the second outbound text message based on the first grouping comprises generating the second outbound text message according to the first semantic meaning. In some examples, the method further comprises determining a first n-gram; and determining the first grouping of the plurality of inbound text messages comprises determining that each inbound text message of the first grouping comprises the first n-gram. In some examples, determining the first n-gram comprises determining, based on an occurrence frequency of the first-n-gram within a corpus of response messages, that the first n-gram is statistically significant. In some examples, the first n-gram comprises a graphic. In some examples, the method further comprises associating the first-n-gram with a first semantic meaning; determining the first grouping of the plurality of inbound text messages further comprises determining that each inbound text message of the first grouping is associated with the first semantic meaning, and generating the second outbound text message based on the first grouping comprises generating the second outbound text message according to the first semantic meaning. In some examples, the method further comprises associating the first n-gram with a second semantic meaning different from the first semantic meaning; and determining the first grouping of the plurality of inbound text messages further comprises determining that each inbound text message of the first grouping is not associated with the second semantic meaning. In some examples, presenting the first grouping to the client comprises presenting to the client, via a graphical user interface, a plurality of groupings including the first grouping; and the method further comprises receiving, from the client via the graphical user interface, a selection of the first grouping.

In examples, a non-transitory computer-readable medium stores instructions which, when executed by one or more processors, cause the one or more processors to perform a method comprising transmitting a first outbound text message via a message broker of a messaging platform from a client to a plurality of recipients. In response to the first outbound message, a plurality of inbound text messages is received, via the message broker, from the plurality of recipients. A first grouping of the plurality of inbound text messages is determined, the first grouping associated with one or more recipients of the plurality of recipients. The first grouping is presented to the client. A second outbound text message is transmitted, via the message broker, from the client to the one or more recipients of the plurality of recipients. The second outbound text message is generated based on the first grouping. The message broker is in communication with a first messaging service and a second messaging service different from the first messaging service. The first outbound text message is transmitted via the first messaging service. A first inbound text message of the plurality of inbound text messages is received via the second messaging service. Each inbound text message of the plurality of inbound text message is addressed to a long-code telephone number generated by the messaging platform and uniquely associated with the client by the messaging platform. In some examples, the first outbound text message is associated with a first time; and determining the first grouping of the plurality of inbound text messages comprises determining that each inbound text message of the first grouping was sent within a threshold time of the first time. In some examples, determining the first grouping of the plurality of inbound text messages comprises determining that each inbound text message of the first grouping is associated with a first semantic meaning; and generating the second outbound text message based on the first grouping comprises generating the second outbound text message according to the first semantic meaning. In some examples, the method further comprises determining a first n-gram; and determining the first grouping of the plurality of inbound text messages comprises determining that each inbound text message of the first grouping comprises the first n-gram. In some examples, determining the first n-gram comprises determining, based on an occurrence frequency of the first-n-gram within a corpus of response messages, that the first n-gram is statistically significant. In some examples, the first n-gram comprises a graphic. In some examples, the method further comprises associating the first-n-gram with a first semantic meaning; determining the first grouping of the plurality of inbound text messages further comprises determining that each inbound text message of the first grouping is associated with the first semantic meaning, and generating the second outbound text message based on the first grouping comprises generating the second outbound text message according to the first semantic meaning. In some examples, the method further comprises associating the first n-gram with a second semantic meaning different from the first semantic meaning; and determining the first grouping of the plurality of inbound text messages further comprises determining that each inbound text message of the first grouping is not associated with the second semantic meaning. In some examples, presenting the first grouping to the client comprises presenting to the client, via a graphical user interface, a plurality of groupings including the first grouping; and the method further comprises receiving, from the client via the graphical user interface, a selection of the first grouping.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
transmitting, via a message broker of a messaging platform, a first outbound text message from a client to a plurality of recipients, wherein the messaging platform is configured to communicate with the client via a first client device, the first client device remote to the message broker;
receiving, via the message broker from the plurality of recipients, a plurality of inbound text messages in response to the first outbound message;
determining a first grouping of the plurality of inbound text messages, the first grouping associated with one or more recipients of the plurality of recipients;
presenting the first grouping to the client; and
transmitting, via the message broker, a second outbound text message from the client to the one or more recipients of the plurality of recipients, wherein the second outbound text message is generated based on the first grouping, wherein:
the message broker is in communication with a first messaging service and a second messaging service different from the first messaging service,
the first outbound text message is transmitted via the first messaging service,
a first inbound text message of the plurality of inbound text messages is received via the second messaging service, and
each inbound text message of the plurality of inbound text message is addressed to a long-code telephone number generated by the messaging platform and uniquely associated with the client by the messaging platform.

2. The method of claim 1, wherein:
the first outbound text message is associated with a first time; and
determining the first grouping of the plurality of inbound text messages comprises determining that each inbound text message of the first grouping was sent within a threshold time of the first time.

3. The method of claim 1, wherein:
determining the first grouping of the plurality of inbound text messages comprises determining that each inbound text message of the first grouping is associated with a first semantic meaning; and
generating the second outbound text message based on the first grouping comprises generating the second outbound text message according to the first semantic meaning.

4. The method of claim 1, wherein:
the method further comprises determining a first n-gram; and
determining the first grouping of the plurality of inbound text messages comprises determining that each inbound text message of the first grouping comprises the first n-gram.

5. The method of claim 4, wherein determining the first n-gram comprises determining, based on an occurrence frequency of the first-n-gram within a corpus of response messages, that the first n-gram is statistically significant.

6. The method of claim 4, wherein the first n-gram comprises a graphic.

7. The method of claim 4, wherein:
the method further comprises associating the first-n-gram with a first semantic meaning;
determining the first grouping of the plurality of inbound text messages further comprises determining that each inbound text message of the first grouping is associated with the first semantic meaning, and
generating the second outbound text message based on the first grouping comprises generating the second outbound text message according to the first semantic meaning.

8. The method of claim 7, wherein:
the method further comprises associating the first n-gram with a second semantic meaning different from the first semantic meaning; and
determining the first grouping of the plurality of inbound text messages further comprises determining that each inbound text message of the first grouping is not associated with the second semantic meaning.

9. The method of claim 1, wherein:
presenting the first grouping to the client comprises presenting to the client, via a graphical user interface, a plurality of groupings including the first grouping; and
the method further comprises receiving, from the client via the graphical user interface, a selection of the first grouping.

10. A system comprising:
a messaging platform comprising a network interface and further comprising a message broker, the message broker in communication via the network interface with a first messaging service and a second messaging service different from the first messaging service, wherein the messaging platform is configured to communicate with a client via a first client device, the first client device remote to the message broker; and
one or more processors configured to perform a method comprising:
transmitting, via the message broker, a first outbound text message from the client to a plurality of recipients;
receiving, via the message broker from the plurality of recipients, a plurality of inbound text messages in response to the first outbound message;
determining a first grouping of the plurality of inbound text messages, the first grouping associated with one or more recipients of the plurality of recipients;
presenting the first grouping to the client; and
transmitting, via the message broker, a second outbound text message from the client to the one or more recipients of the plurality of recipients, wherein the second outbound text message is generated based on the first grouping,
wherein:
the first outbound text message is transmitted via the first messaging service,
a first inbound text message of the plurality of inbound text messages is received via the second messaging service, and
each inbound text message of the plurality of inbound text message is addressed to a long-code telephone number generated by the messaging platform and uniquely associated with the client by the messaging platform.

11. The system of claim 10, wherein:
the first outbound text message is associated with a first time; and
determining the first grouping of the plurality of inbound text messages comprises determining that each inbound text message of the first grouping was sent within a threshold time of the first time.

12. The system of claim 10, wherein:
determining the first grouping of the plurality of inbound text messages comprises determining that each inbound text message of the first grouping is associated with a first semantic meaning; and
generating the second outbound text message based on the first grouping comprises generating the second outbound text message according to the first semantic meaning.

13. The system of claim 10, wherein:
the method further comprises determining a first n-gram; and
determining the first grouping of the plurality of inbound text messages comprises determining that each inbound text message of the first grouping comprises the first n-gram.

14. The system of claim 13, wherein determining the first n-gram comprises determining, based on an occurrence frequency of the first-n-gram within a corpus of response messages, that the first n-gram is statistically significant.

15. The system of claim 13, wherein the first n-gram comprises a graphic.

16. The system of claim 13, wherein:
the method further comprises associating the first-n-gram with a first semantic meaning;
determining the first grouping of the plurality of inbound text messages further comprises determining that each inbound text message of the first grouping is associated with the first semantic meaning, and
generating the second outbound text message based on the first grouping comprises generating the second outbound text message according to the first semantic meaning.

17. The system of claim 16, wherein:
the method further comprises associating the first n-gram with a second semantic meaning different from the first semantic meaning; and
determining the first grouping of the plurality of inbound text messages further comprises determining that each inbound text message of the first grouping is not associated with the second semantic meaning.

18. The system of claim 10, wherein:
presenting the first grouping to the client comprises presenting to the client, via a graphical user interface, a plurality of groupings including the first grouping; and
the method further comprises receiving, from the client via the graphical user interface, a selection of the first grouping.

19. A non-transitory computer-readable medium storing instructions which, when executed by one or more processors, cause the one or more processors to perform a method comprising:
transmitting, via a message broker of a messaging platform, a first outbound text message from a client to a plurality of recipients, wherein the messaging platform is configured to communicate with the client via a first client device, the first client device remote to the message broker;
receiving, via the message broker from the plurality of recipients, a plurality of inbound text messages in response to the first outbound message;
determining a first grouping of the plurality of inbound text messages, the first grouping associated with one or more recipients of the plurality of recipients;
presenting the first grouping to the client; and
transmitting, via the message broker, a second outbound text message from the client to the one or more recipients of the plurality of recipients, wherein the second outbound text message is generated based on the first grouping,
wherein:
the message broker is in communication with a first messaging service and a second messaging service different from the first messaging service,
the first outbound text message is transmitted via the first messaging service,
a first inbound text message of the plurality of inbound text messages is received via the second messaging service, and
each inbound text message of the plurality of inbound text message is addressed to a long-code telephone number generated by the messaging platform and uniquely associated with the client by the messaging platform.

20. The non-transitory computer-readable medium of claim 19, wherein:
the first outbound text message is associated with a first time; and
determining the first grouping of the plurality of inbound text messages comprises determining that each inbound text message of the first grouping was sent within a threshold time of the first time.

21. The non-transitory computer-readable medium of claim 19, wherein:
determining the first grouping of the plurality of inbound text messages comprises determining that each inbound text message of the first grouping is associated with a first semantic meaning; and
generating the second outbound text message based on the first grouping comprises generating the second outbound text message according to the first semantic meaning.

22. The non-transitory computer-readable medium of claim 19, wherein:
the method further comprises determining a first n-gram; and
determining the first grouping of the plurality of inbound text messages comprises determining that each inbound text message of the first grouping comprises the first n-gram.

23. The non-transitory computer-readable medium of claim 22, wherein determining the first n-gram comprises determining, based on an occurrence frequency of the first-n-gram within a corpus of response messages, that the first n-gram is statistically significant.

24. The non-transitory computer-readable medium of claim 22, wherein the first n-gram comprises a graphic.

25. The non-transitory computer-readable medium of claim 22, wherein:
the method further comprises associating the first-n-gram with a first semantic meaning;
determining the first grouping of the plurality of inbound text messages further comprises determining that each inbound text message of the first grouping is associated with the first semantic meaning, and
generating the second outbound text message based on the first grouping comprises generating the second outbound text message according to the first semantic meaning.

26. The non-transitory computer-readable medium of claim 25, wherein:
the method further comprises associating the first n-gram with a second semantic meaning different from the first semantic meaning; and
determining the first grouping of the plurality of inbound text messages further comprises determining that each inbound text message of the first grouping is not associated with the second semantic meaning.

27. The non-transitory computer-readable medium of claim 19, wherein:
presenting the first grouping to the client comprises presenting to the client, via a graphical user interface, a plurality of groupings including the first grouping; and
the method further comprises receiving, from the client via the graphical user interface, a selection of the first grouping.

* * * * *